(12) United States Patent
Moy

(10) Patent No.: US 9,600,132 B2
(45) Date of Patent: Mar. 21, 2017

(54) USING CUSTOM RTF COMMANDS TO EXTEND CHAT FUNCTIONALITY

(71) Applicant: Microsoft Technology Licensing, LLC, Redmond, WA (US)

(72) Inventor: David J. Moy, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 582 days.

(21) Appl. No.: 13/686,910

(22) Filed: Nov. 27, 2012

(65) Prior Publication Data

US 2014/0149891 A1 May 29, 2014

(51) Int. Cl.
*G06F 3/048* (2013.01)
*G06Q 10/10* (2012.01)
*H04L 12/58* (2006.01)

(52) U.S. Cl.
CPC .......... *G06F 3/048* (2013.01); *G06Q 10/107* (2013.01); *H04L 51/04* (2013.01); *H04L 51/16* (2013.01); *H04L 51/18* (2013.01)

(58) Field of Classification Search
CPC ................................................... H04L 12/586
USPC ....................................................... 715/759
See application file for complete search history.

(56) References Cited

U.S. PATENT DOCUMENTS

| | | | | |
|---|---|---|---|---|
| 5,870,548 A * | 2/1999 | Nielsen | .......................... | 709/206 |
| 2003/0177192 A1 * | 9/2003 | Umeki | .............. | G06F 17/30699 709/206 |
| 2004/0162877 A1 * | 8/2004 | Van Dok | ............... | G06F 3/0481 709/204 |
| 2004/0210569 A1 * | 10/2004 | Frieden et al. | .................... | 707/3 |
| 2005/0004986 A1 * | 1/2005 | Aoki | ....................... | G06F 9/543 709/206 |
| 2007/0208802 A1 * | 9/2007 | Barman | ................. | G06Q 10/10 709/203 |
| 2008/0109462 A1 * | 5/2008 | Adams et al. | ................. | 707/101 |
| 2009/0119606 A1 * | 5/2009 | Gilbert | .......................... | 715/758 |
| 2010/0205545 A1 * | 8/2010 | Dawson et al. | .............. | 715/758 |
| 2010/0318618 A1 * | 12/2010 | Parker | ............... | G06F 17/30893 709/206 |
| 2012/0198360 A1 * | 8/2012 | Wanderski et al. | ........... | 715/758 |
| 2012/0209926 A1 * | 8/2012 | Backholm | .............. | G06Q 50/01 709/206 |
| 2012/0210253 A1 * | 8/2012 | Luna | .................... | G06Q 10/107 715/753 |
| 2013/0073995 A1 * | 3/2013 | Piantino et al. | .............. | 715/764 |
| 2013/0125063 A1 * | 5/2013 | Lee et al. | ....................... | 715/854 |
| 2013/0185363 A1 * | 7/2013 | DeLuca | .................. | H04L 51/16 709/206 |
| 2014/0101266 A1 * | 4/2014 | Bueno et al. | .................. | 709/206 |

OTHER PUBLICATIONS

Biblioscape ("Rich Text Format (RTF) Version 1.5 Specification" 2000).*

(Continued)

*Primary Examiner* — Jennifer To
*Assistant Examiner* — Beau Spratt
(74) *Attorney, Agent, or Firm* — Christopher J. Volkmann; Kelly, Holt & Christenson, PLLC

(57) ABSTRACT

A device identifies a location for a custom RFT command in a message. The custom RTF command is stored in the identified location of the message. The device also receives such messages and detects the custom RTF command in the message and acts upon the detected RTF command.

18 Claims, 19 Drawing Sheets

(56) References Cited

OTHER PUBLICATIONS

"International Search Report & Written Opinion for PCT Application No. PCT/US2013/071880", Mailed Date: Mar. 6, 2014, Filed Date: Nov. 26, 2013, 9 Pages.

Wikipedia, "Rich Text Format", Published on: Nov. 12, 2012, Available at http://en.wikipedia.org/w/index.php?title=Rich_Text_Format&oldid=522728022.

Microsoft, "Rich Text Format (RTF) Specification, version 1.9.1", Published on: Mar. 19, 2008, Available at: http://www.microsoft.com/en-us/download/confirmation.aspx?id=10725.

Saint-Andre, Peter, "XEP-0071: XHTML-IM, Version 1.4", Published on: Sep. 3, 2008, Available at: http://interaction.lille.inria.fr/~roussel/pub/xep2pdf/xep-0071.pdf.

Wikipedia, "XMPP", Published on: Nov. 14, 2012, Available at: http://en.wikipedia.org/w/index.php?title=XMPP&oldid=522961715.

Resnick, P., "Internet Message Format", Available at: <<http://iaoc.ietf.org/documents/337-TA-850-IETF00158.pdf>>, Network Working Group, RFC-2822, Apr. 2001, pp. 37-39.

Saint-Andre, et al., "XMPP: The Definitive Guide", Available at: <<http://oriolrius.cat/blog/wp-content/uploads/2009/10/Oreilly.XMPP.The.Definitive.Guide.May.2009.pdf>>, A O'Reilly Publication, May 4, 2009, pp. v-ix.

\* cited by examiner

{\rtf1\fbidis\ansi\ansicpg1252\deff0\nouicompat\deflang1033{\fonttbl{\f0\fnil\fcharset0 Segoe UI;}{\f1\fnil Segoe UI;}} {\colortbl ;\red0\green0\blue0;} {\*\generator Riched20 15.0.4423 (Debug)}{\*\mmathPr\mwrapIndent1440 }\viewkind4\uc1 \pard\cf1\embo\f0\fs20 test\embo0\f1\par {\*\lyncflags rtf=1}}

FIG. 3B

```
{\rtf1\fbidis\ansi\ansicpg1252\deff0\nouicompat\deflang1033\fonttbl{\f0\fnil\fcharset0 Segoe UI;}{\f1\fnil Segoe UI;}} {\colortbl ;\red0\green0\blue0;} {\*\generator Riched20 15.0.4423 (Debug)}{\*\mmathPr\mwrapIndent1440 }\viewkind4\uc1 \pard\cf1\embo\f0\fs20 test\embo0\f1\par {\*\lyncflags rtf=1}{\*\CustomRtfCommand Nobody will ever implement this rtf command}}
```

FIG. 3C

David M

Contrary to popular belief, Lorem Ipsum is not simply random text. It has roots in a piece of classical Latin literature from 45 BC, making it over 2000 years old. Richard McClintock, a Latin professor at Hampden-Sydney College in Virginia, looked up one of the more obscure Latin words, consectetur, from a Lorem Ipsum passage, and going through the cities of the word in classical literature, discovered the undoubtable source. Lorem Ipsum comes from sections 1.10.32 and 1.10.33 of "deFinibus Bonorum et Malorum" (The Extremes of Good and Evil) by Cicero, written in 45 BC. This book is a treatise of the theory of ethics, very popular during the Renaissance. The first line of Lorem ipsum dolor sit amet..", comes from a line in section 1.10.32.

Sent 5 day(s) ago

David M

Contrary to popular belief, Lorem Ipsum is not simply random text. It has roots in a piece of classical Latin literature from 45 BC, making it over 2000 years old. Richard McClintock, a Latin professor at Hampden-Sydney College in Virginia, looked up one of the more obscure Latin words, consectetur, from a Lorem Ipsum passage, and going through the cities of the word in classical literature, discovered the undoubtable source. Lorem Ipsum comes from sections 1.10.32 and 1.10.33 of "deFinibus Bonorum et Malorum" (The Extremes of Good and Evil) by Cicero, written in 45 BC. This book is a treatise of the theory of ethics, very popular during the Renaissance. The first line of Lorem ipsum dolor sit amet..", comes from a line in section 1.10.32.

Sent 5 day(s) ago

FIG. 5C

USING CUSTOM RTF COMMANDS TO EXTEND CHAT FUNCTIONALITY

BACKGROUND

Rich text format (RTF) commands encode formatted text and graphics for easy transfer between applications. A system that employs RTF commands includes a writer that is a component that takes a formatted file and turns it into an RTF file. The writer separates the application's control information from the actual text and writes a new file containing the text and RTF groups associated with that text. The system also includes a reader that is a component that translates an RTF file into a formatted file.

An RTF file includes the unformatted text, itself, as well as a number of other things. The RTF file includes control words that mark printer control codes and other information used to manage a document. The RTF file also includes control symbols such as a backslash followed by a single non-alpha character. The RTF file includes groups which have text and control words or control symbols enclosed in braces. The braces specify the text that is affected by the group and the different attributes of that text represented by the control words and control symbols.

In some communication systems, such as chat room systems and instant messaging systems, messages are exchanged between various users. In an instant messaging system, there is no separate database that holds message attributes. Instant messaging systems provide messages as a flat list of messages that a user cannot interact with. In a chat room system, a database holds different properties of the messages, such as the identity of the person who sent the message, when the message was sent, etc.

It is difficult to add a new message property in either of these systems. In the chat room system, which includes a database that holds message properties, either the schema or the architecture must be changed in order to add a property. In the instant messaging system, there is no separate database that holds message properties. Therefore, both of these types of communication systems are fairly limited in their ability to generate messages that can be interacted with by other users, or that can be operated on in other ways, other than conventional text formatting employed by conventional RFT commands.

The discussion above is merely provided for general background information and is not intended to be used as an aid in determining the scope of the claimed subject matter.

SUMMARY

A device identifies a location for a custom RTF command in a message. The custom RTF command is stored in the identified location of the message. The device also receives such messages and detects the custom RTF command in the message and acts upon the detected RTF command.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3C are examples of RTF messages.

FIGS. 5A-5F show illustrative user interface displays.

DETAILED DESCRIPTION

Figure 1:
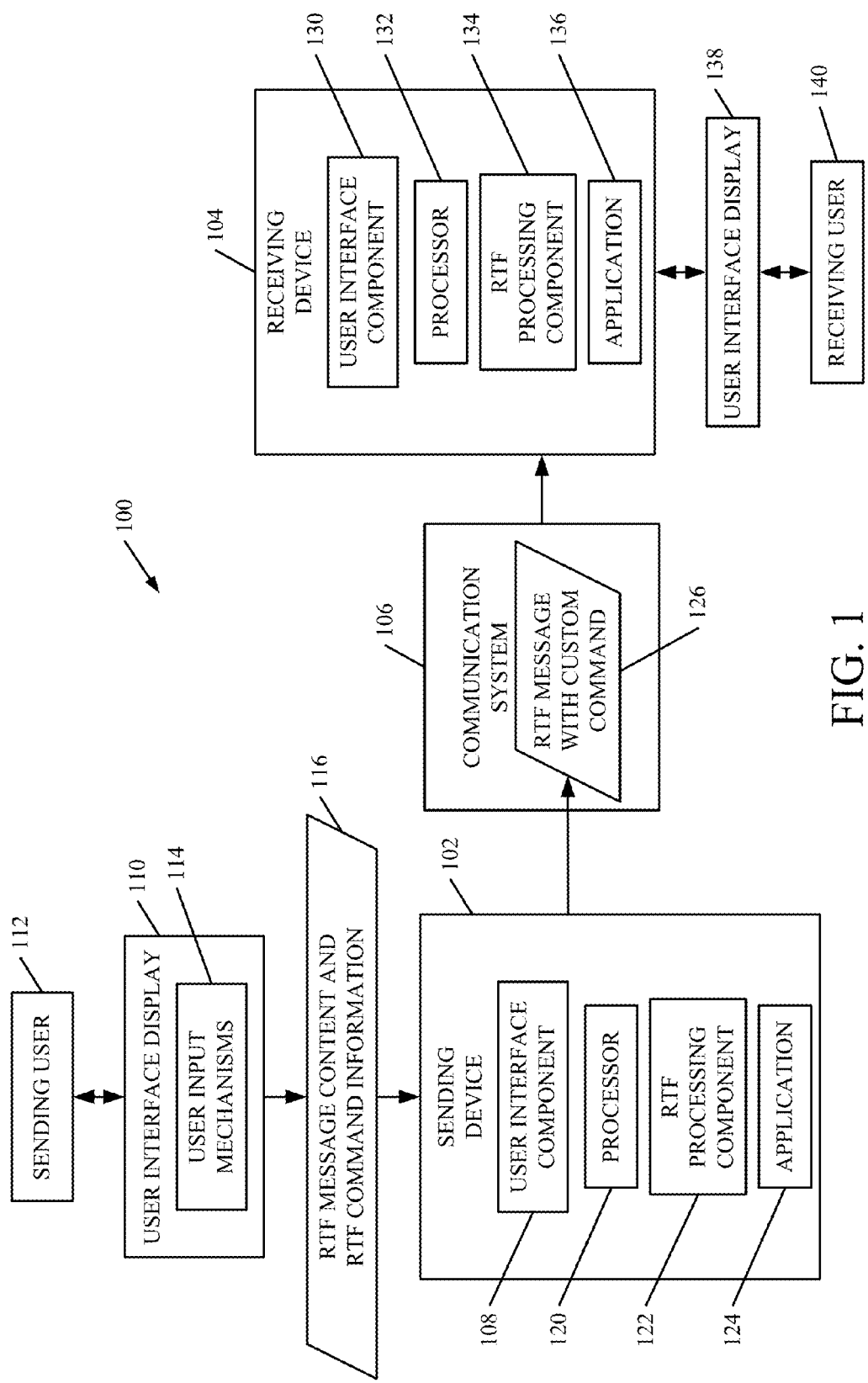
FIG. 1 is a block diagram of one embodiment of a messaging system.

FIG. 1 is a block diagram of one illustrative embodiment of a messaging system 100. Messaging system 100 includes sending device 102 and receiving device 104. The sending device 102 sends messages through a communication system 106 to receiving device 104. Of course, it will be realized that in one embodiment, sending device 102 can be a receiving device receiving messages from device 104, which acts as a sending device and vice versa. That is, both devices can act as sending devices and receiving devices to carry out communication. However, for the sake of the present discussion, the message communications will be described as flowing from sending device 102 to receiving device 104. This is described for the sake of example only.

Sending device 102 has a user interface component 108 that generates user interface displays 110 for display to, or interaction by (or both), a sending user 112. User interface displays 110 include user input mechanisms 114 that allow sending user 112 to provide user inputs to control sending device 102 to generate a message that is to be sent to receiving device 104. In providing the user inputs, sending user 112 illustratively generates RTF message content and RTF command information 116.

The user input mechanisms 114 can be a wide variety of user input mechanisms, such as text boxes, buttons, drop-down menus, links, icons, or other user input mechanisms. They can be activated in one of a variety different ways, including by using a point and click device (such as a mouse or track ball), a software or hardware keyboard or keypad, or voice inputs. In addition, if the display device used to display user interface displays 110 is a touch sensitive screen, user input mechanisms 114 can be actuated using touch gestures, such as with the user's finger or a stylus, or another device. Other ways of actuating a user input mechanism can be used as well.

Sending device 102 not only includes user interface component 108, but also includes processor 120, RTF processing component 122 and application 124. Application 124 is illustratively a messaging application that generates the user interface displays 110, using user interface component 108, to allow user 112 to generate and send a message. RTF processing component 122 illustratively receives the message content and command information 116 and generates an RTF message based on that information. In addition, where custom command information is included, RTF processing component 122 identifies a location within the RTF message where the custom command is to be inserted and inserts that information at the identified location. This is described in greater detail below with respect to FIG. 2.

Processor 120 is illustratively a computer processor with associated memory and timing circuitry (not separately shown). Processor 120 is illustratively activated by, and facilities the functionality of, component 122, component 108 and application 124, and other components or items in sending device 102. It will be noted that while a single processor 120 is shown, multiple processors could be used as well. In addition, sending device 102 can have a data store that is local to device 102 or remote therefrom, or multiple data stores, some of which are local and some of which are remote.

Communication system 106 is illustratively any communication system that allows an RTF message to be sent. For instance, communication system 106 can be an instant messaging system. In that case, application 124 is an instant messaging application that is used to generate a message. Communication system 106 can also be a system that enables messaging in a chat room, it can be a messaging system on a social media network, or it can be a variety of other communication systems that allow messaging. In each of those embodiments, application 124 and RTF processing component 122 facilitate generation and sending RTF messages. In any case, communication system 106 illustratively receives the RTF message with the custom commands 126 that are generated by RTF processing component 122 in sending device 102, and sends them to receiving device 104.

Receiving device 104 illustratively includes user interface component 130, processor 132, RTF processing component 134 and application 136. RTF processing component 134 illustratively receives the RTF message with custom commands 126 and generates a user interface display 138, using user interface component 130, for display or to, or interaction by (or both), receiving user 140. In doing so, component 134 illustratively formats the content of the RTF message 126 based on the control command and control symbols and groups in the message, and also acts on the custom command inserted within the RTF message 126. This is described in greater detail below with respect to FIG. 4.

Application 136 is illustratively an application that allows device 104 to receive messages and to display them to receiving user 140. In doing so, application 136 illustratively uses user interface component 130 to generate the displays as user interface displays 138.

Processor 132 is illustratively a computer processor with associated memory and timing circuitry (not separately shown). It is a functional part of device 104 and is activated by, and facilitates the functionality of, RTF processing component 134, application 136, user interface component 130 and other items in device 104.

As is described in greater detail below with respect to FIG. 4, RTF processing component 134 receives message 126 and identifies the custom command disposed therein and generates a properly formatted message, based on the RTF commands and symbols. It also takes appropriate action based upon the custom command in the RTF message 126.

Figure 2:
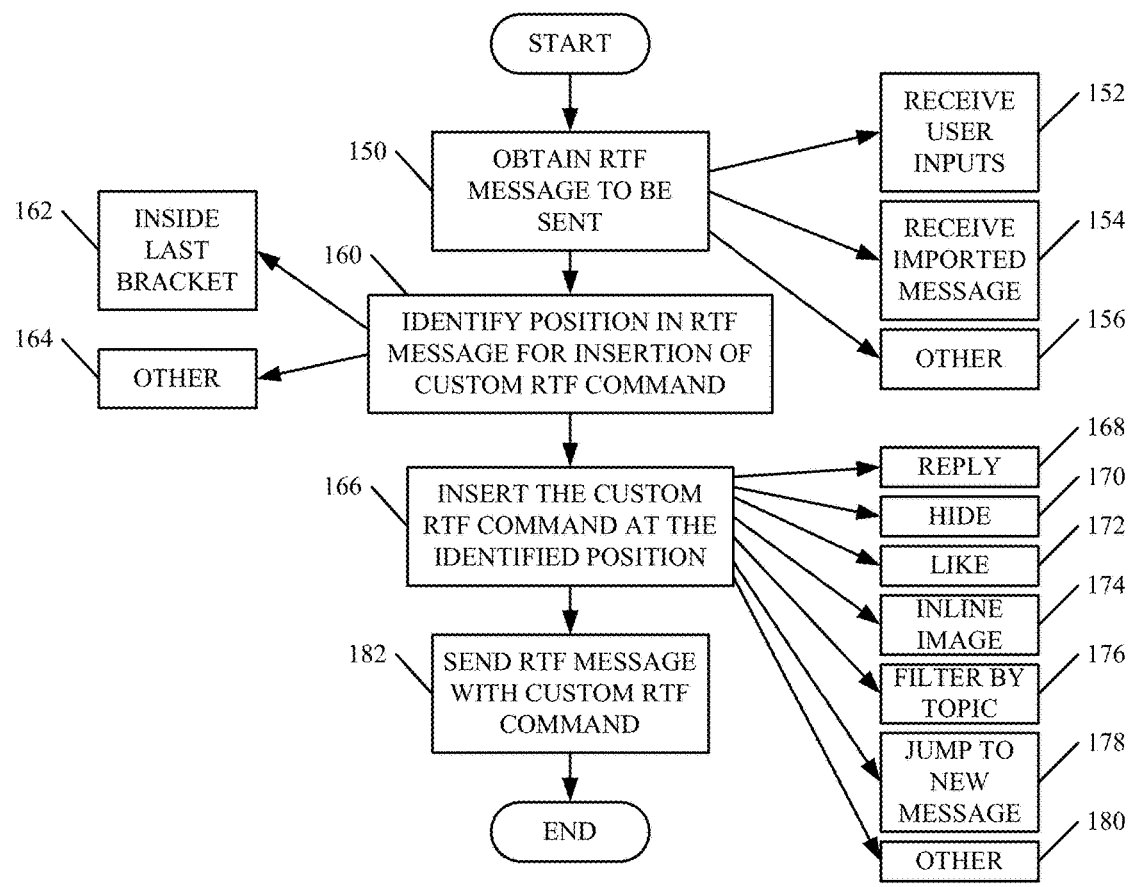
FIG. 2 is a flow diagram illustrating one embodiment of the operation of the sending device shown in FIG. 1 in generating and sending a customized RTF message.

FIG. 2 is a flow diagram illustrating one embodiment of the operation of sending device 102 in generating and sending a custom RTF message. The messaging application 124 is first launched and sending user 112 provides user inputs 116 indicating message content along with RTF command information. By way of example, this may include text in a message, along with an indication that certain text is to be bolded or underlined, or to include other formatting indicated by conventional RTF command information. Obtaining the RTF message to be sent is indicated by block 150 in FIG. 2. Receiving user inputs to obtain the message is indicated by block 152. The message could also be imported from another messaging system or obtained in other ways as well, and this is indicated by blocks 154 and 156 in FIG. 2.

In one embodiment, the user 112 also provides information (such as interacting with a given user input mechanism 114) indicative of a custom RTF command to be included in the message. A variety of these different types of custom commands are described below with respect to FIGS. 5A-5F. For the sake of example, the custom RTF command used for the present description will be a "reply to a parent" command. In that case, the user is specifically replying to a parent message that was received. Therefore, RTF processing component 134 and receiving device 104 identifies that the RTF message 126 that was received from user 112 is a reply to an identified parent message and generates a display for user 140 showing the reply message juxtaposed to the parent message.

Using this example, RTF processing component 122 receives as inputs 116 from user 112 an indication that the current message is a reply to a parent message. Therefore, the custom RTF command will indicate this. RTF processing component 122 thus identifies a position in the RTF message for insertion of the custom RTF command. This is indicated by block 160 in FIG. 2.

There are a variety of different places that this could be inserted. In one example, the custom RTF command is inserted inside the last bracket of a conventional RTF message, and this is indicated by block 162 in FIG. 2. Of course, the position where the custom RTF command can be inserted might be another place as well, and this is indicated by block 164 in FIG. 2.

Once RTF processing component 122 has identified the place where the custom RTF command is to be inserted, the custom RTF command is inserted at the identified position, in order to generate the RTF message with the custom command 126 (shown in FIG. 1). This is indicated by block 166 in FIG. 2. There are a wide variety of different types of custom RTF commands that can be used. By "custom" it is meant that the RFT command has an affect on the RTF message that is anything other than a format of the textual content of the message. In other words, an RTF command formats the textual content of the message. A custom RTF command does something other than format the textual content.

A number of examples of how the custom RTF commands can be used are shown in FIG. 2. For instance, the custom RTF command can indicate that the RTF message 126 is a reply to a parent message. This is indicated by block 128. The custom RTF command can also indicate that a parent message is to be hidden. By way of example, assume that sending user 112 has sent a message to receiving user 140, but the sending user 112 sent the message erroneously or has changed his or her mind about wanting to send a message. In that case, sending user 112 can send another RTF message that simply references the parent message and has a custom command indicating that the parent message should be written over with blank spaces (e.g., it should be hidden). The "hide" custom RTF command is indicated by block 170 in FIG. 2.

If the message 126 is on a social network, the custom RTF command may indicate that the sending user 112 "likes" the parent message. This is indicated by block 172. The custom RTF command can be used to insert an inline image in the message string. This is indicated by block 174. The custom command can also be used to filter the messages by topic. This is indicated by block 176.

In addition, if the implementation is in a chat room, it may happen that one of the users is reviewing the chat messages, and then signs off or leaves the chat room for a period of time. Similarly, when the user reenters the chat room, the user simply picks up with the most recent messages posted in the chat room. However, before leaving the chat room, the sending user 112 can send an RTF message with a custom RTF command that is a book mark command. Then, when the user 112 returns to the chat room, the custom RTF command will identify the location where the user left off in the chat messages in the chat room. Thus, user 112 can immediately jump to the next new message that was posed after the user left the chat room. This is indicated by block 178 in FIG. 2. Of course, there are a wide variety of other uses for custom RTF commands, and this is indicated by block 180 in FIG. 2.

In one embodiment, and as is described in greater detail below, each of the custom RTF commands can be input by user 112 using a suitable user input mechanism 114. For instance, the RTF processing component 122 or application 124 can generate a user interface display in the messaging system with a "reply" button. When the user actuates the "reply" button, this indicates to RTF processing component 122 that it should insert a custom RTF "reply" command in the RTF message 126. The custom "reply" command identifies the parent message to which the present message is a reply. Similarly, the user interface displays can be generated with a "hide" button, a "like" button, a "specify inline image" button, a "filter by topic" button, a "bookmark" button, or any other type of user input mechanism that can be actuated by user 112 to indicate to RTF processing component 122 that it should insert a corresponding custom RTF command. Of course, other ways of specifying a custom RTF command to be inserted by RTF processing component 122 can be used as well.

In any case, once RTF processing component 122 has inserted the custom RTF command at the identified position, RTF processing component 122 sends the RTF message with the custom command 126 to the receiving device 124. Sending the message is indicated by block 182 in FIG. 2.

Figure 3A:
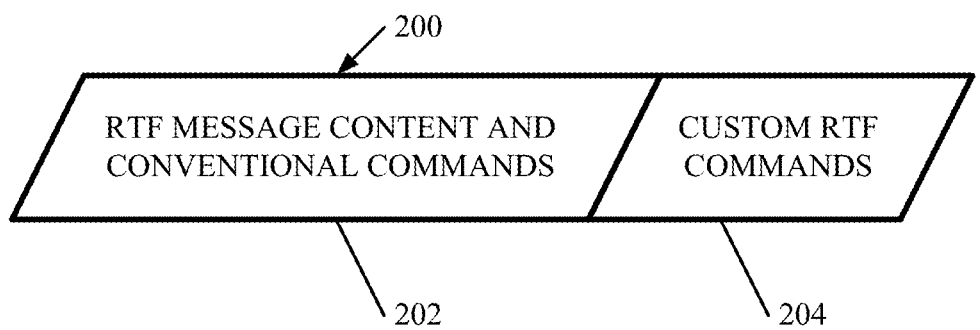

FIGS. 3A-3C illustrate various embodiments of RTF messages with custom commands. FIG. 3A is a block diagram representation of an RTF message 200. RTF message 200 includes an RTF message content and conventional commands portion 202. Portion 202 illustratively contains the message text, along with the conventional RTF commands that indicate how that text is to be formatted. Message 200 also illustratively includes a custom RTF command portion 204 that contains the custom RTF commands inserted by processor 122. The custom RTF command can include the command information identifying the custom command. Also, where the custom command refers to a parent message, a parent message identifier is included as well.

FIGS. 3B and 3C show specific examples of this. FIG. 3B is an example of a standard RTF message that is sent by an RTF processing component. FIG. 3C shows the same message shown in FIG. 3B, except that it also includes the custom RTF command. It can be seen in the embodiment shown in FIG. 3C that the custom RTF command is inserted between the last two French bracket characters in the message shown in FIG. 3B. In order to do this, RTF processing component 122 illustratively identifies the index of the last French bracket character and performs an insert operation at that position. The custom RTF command inserted in the message shown in FIG. 3C is "{\*\customRtfCommand Nobody will ever implement this rtf command}}"

Figure 4:
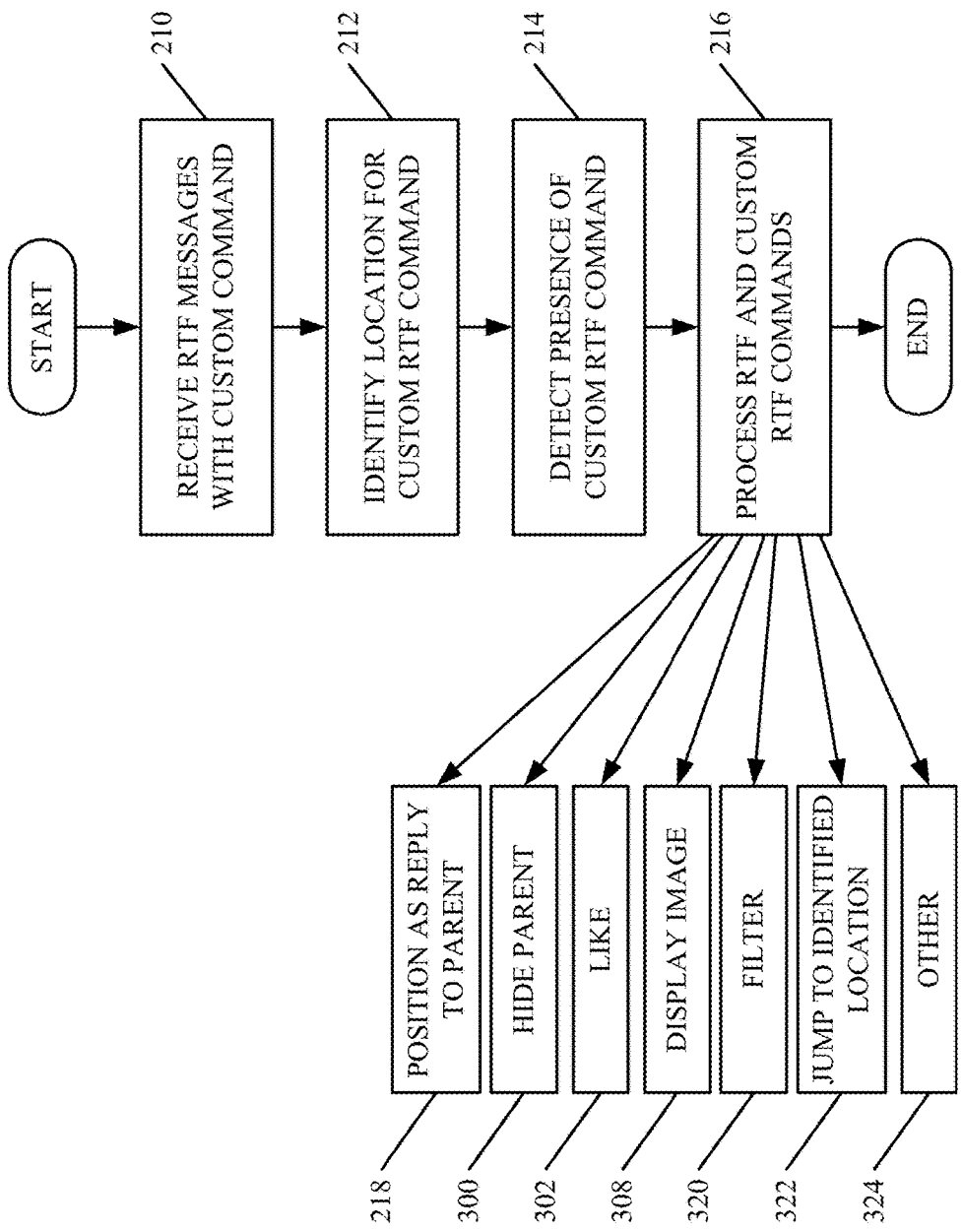
FIG. 4 is a flow diagram illustrating one embodiment of the operation of a receiving device receiving an RTF message with a customized command.

FIG. 4 is a flow diagram illustrating one embodiment of the operation of receiving device 104 in receiving and processing the RTF message with custom commands 126. RTF processing component 134 first receives the RTF message with custom commands 126 from communication system 106. This is indicated by block 210 in FIG. 4. RTF processing component 134 then identifies the location where a custom RTF command would appear in message 126, if it were placed in that message. This is indicated by block 212. Of course, in the embodiment described herein, the custom RTF commands are inserted between the last two French brackets in the conventional RTF message. Therefore, RTF processing component 134, in receiving device 104, checks that location for a custom RTF command.

RTF processing component 134 then detects the presence of the custom RTF command inserted at that position. This is indicated by block 214 in FIG. 4.

RTF processing component 134 then processes the RTF message 126 and takes action based upon the custom RTF commands found in message 126. This is indicated by block 216. For instance, in one embodiment, component 134 uses user interface component 130 to generate and display the message, with the text formatted according to the RTF commands. Processing component 134 then also performs certain other operations based on the custom RTF command.

In one embodiment, where the custom RTF command indicates that the current message is a reply to a parent message, the custom RTF command also illustratively includes the parent ID that identifies the parent message. In that case, RTF processing component 134 positions the current message as a reply to the parent message on the user interface display. This is indicated by block 218 in FIG. 4.

Figure 5A:
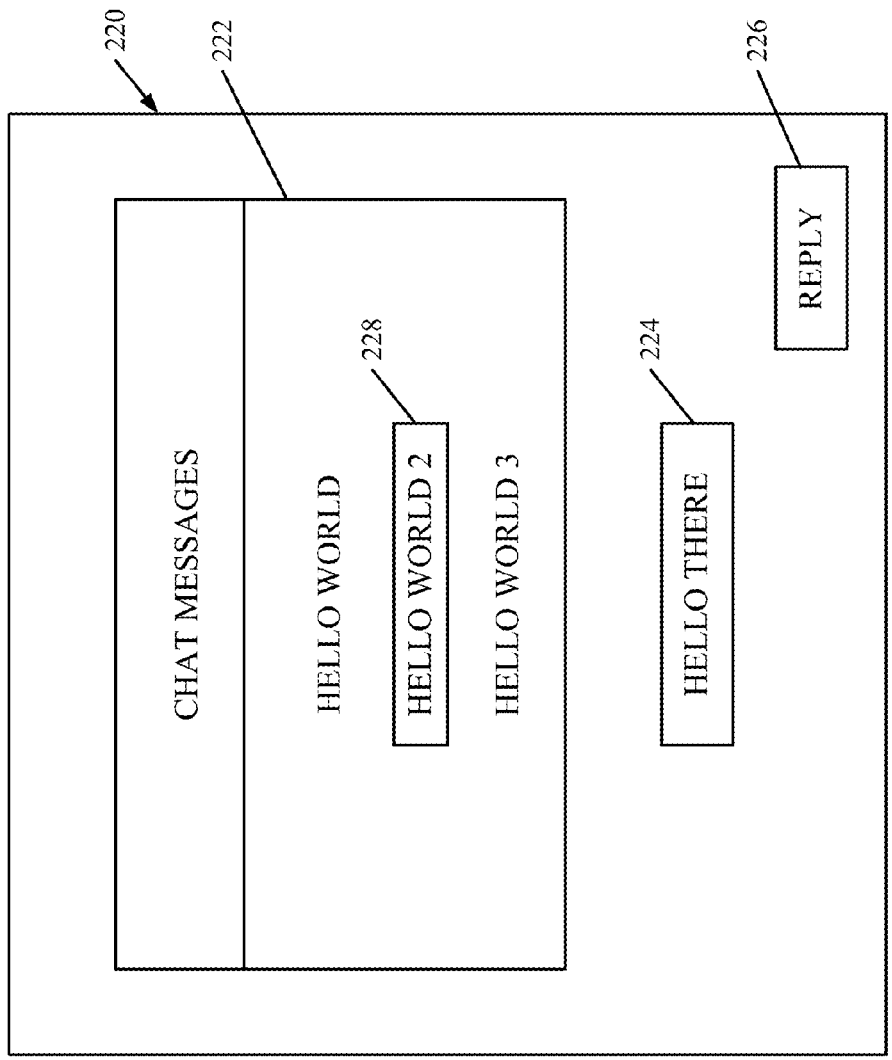
Figure 5B:
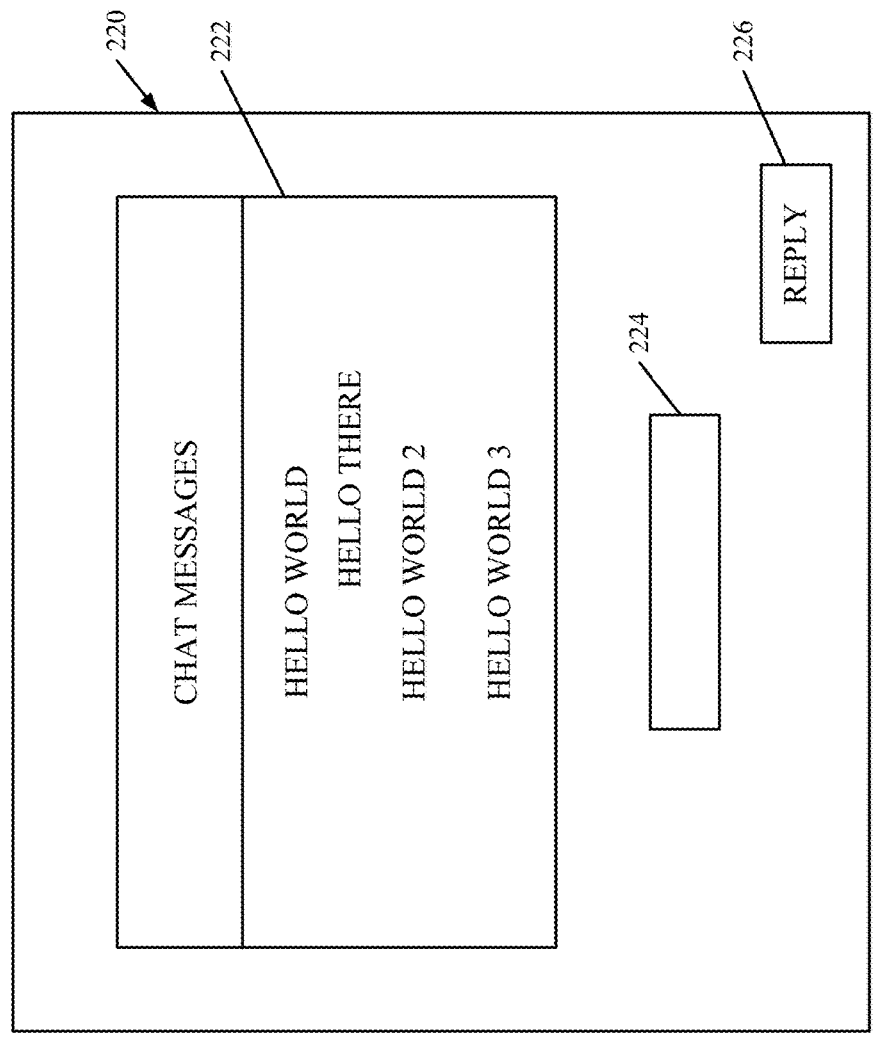

FIGS. 5A and 5B show one embodiment where the messages being sent and replied to are chat messages. FIG. 5A shows a user interface display 220 that has a chat box 222 that shows chat messages. The first chat message is "Hello world" the second is "Hello world 2" and the third is "Hello world 3". User interface display 220 also includes a text box 224 that allows the sending user to type a textual message in box 224.

In addition, user interface display 220 illustratively includes a "reply" button 226. When the user selects one of the messages in chat box 222, types text into text box 224 and hits reply button 226, the text in text box 224 will be generated as an RTF message, with a custom command indicating that it is in reply to the selected message in box 222. In the embodiment shown in FIG. 5A, the user has selected the "Hello world" message 228. Therefore, when the user types the "Hello there" reply message in box 224, and actuates the "reply" button 226, the sending RTF processing component 122 generates an RTF message with the textual content "Hello there" and a custom RTF command indicating that the present message is in reply to a parent message having a parent message identifier (an ID) corresponding to the ID of the "Hello world" message 228.

FIG. 5B shows a user interface display 230 generated by RTF processing component 134 (using user interface component 130) at receiving device 104. User interface display 230 is similar to user interface display 220 shown in FIG. 5A, and similar things are similarly numbered. However, it can now be seen that the "Hello there" reply message 232 has been inserted in juxtaposed position relative to parent message "Hello world". In the embodiment shown, the reply message 232 is beneath, and indented with respect to, the parent message to which it is a reply. Of course, other juxtaposed positions can be used as well.

By way of example, an RTF chat message used to generate the "Hello world" message 228 is given as follows:
{\rtf1\fbidis\ansi\ansicpg1252\deff0\nouicompat\
deflang1033{\fonttbl{\f0\fnil\fcharset0SegoeUI;}
{\f1\fnil Segoe UI;}} {\colorb1;\red0\green0\blude0;{\*\generator Riched20 15.0.4423 (Debug)} {\*\mmathPr\mwrapindent1440 }\viewkind4\uc1 \pard\cf1\embo\f0\fs20 Hello World\embo0 \f1\par}

The RTF message with the custom command indicating that it is a reply to the parent message is given, in one example, as follows:

{\rtf1\fbidis\ansi\anscipg1252\deff0 \nouicompat\deflang1033 {\fonttbl{\f0\fnil\fcharset0Segoe UI;} {f1\fnil Segoe UI;}} {\colorb1;\red0\green0\blue0;} {\*\generator Riched20 15.0.4423 (Debug)} {\*\mmathPr\mwrapindent1440}\viewkind4\uc1 \pard\cf1 \embo\f0\fs20Replay\embo)\par {\*\reply 1}}

It can be seen that the custom RTF command is inserted just prior to the last French bracket of the message and states "{\*\reply 1}". Of course, the particular form of the RTF command shown is exemplary only. Any other desired form of an RTF command to indicate the message is a reply to a parent message could be used as well.

FIG. 5C shows yet another user interface display 240 that indicates the result of processing a "reply" RTF command. It can be seen that a parent message 242 was originally sent and displayed. A reply RTF message 244 was generated, and the custom command indicating that it is a reply to the parent message 242 is inserted in the RTF message. Therefore, the reply can be displayed in juxtaposed position relative to the parent. By simply storing the parent message ID, the reply can reference the parent message ID and be inserted in a proper position relative to the appropriate parent message.

Figure 5D:
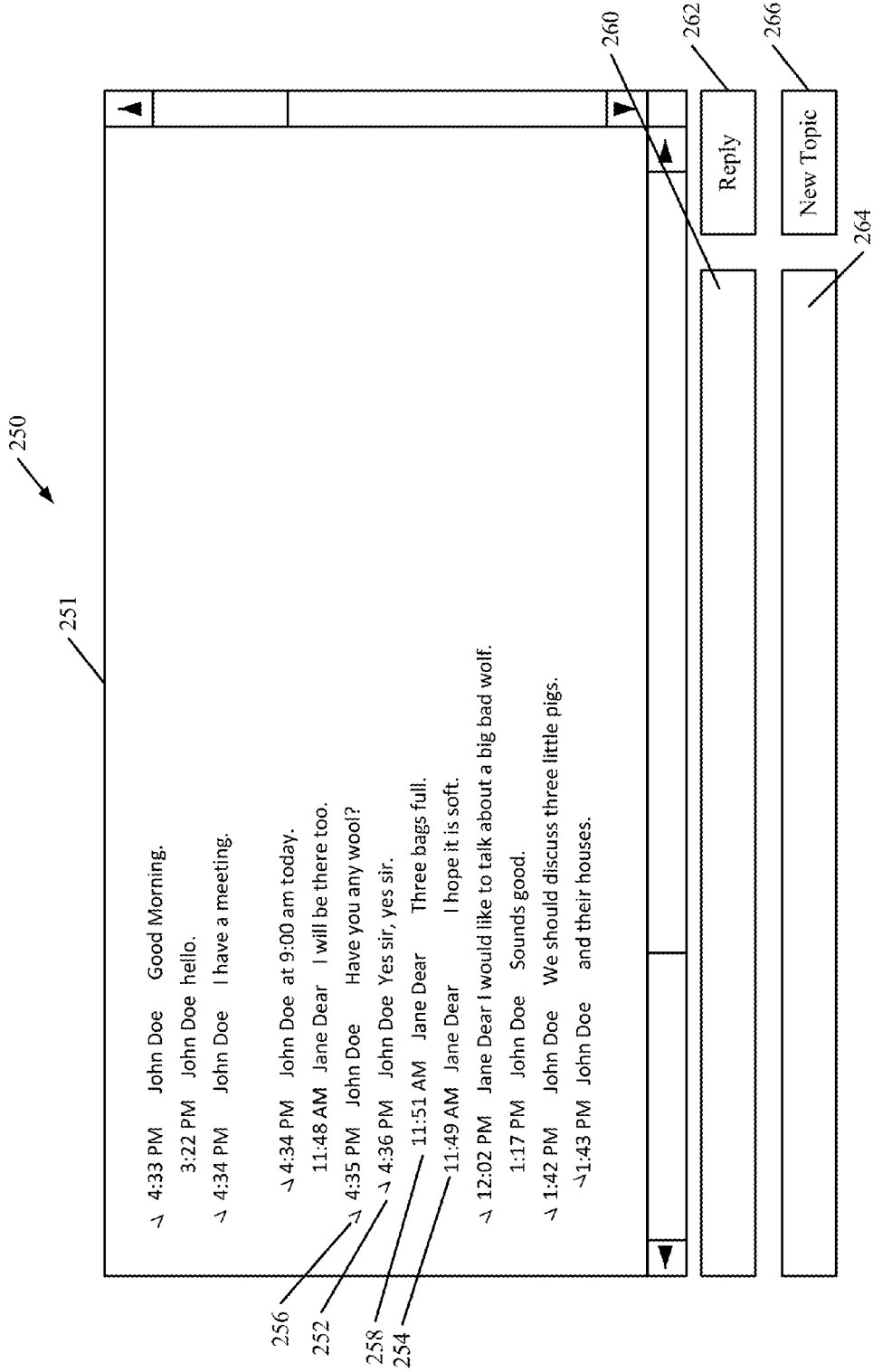

FIG. 5D shows yet another user interface display 250 also illustrating how replies can be used. User interface display 250 shows a plurality of different messages in message pane 251. Each message that is indented relative to a message above it indicates that it is in reply to that message. It can be seen from user interface display 250 that multiple replies to a single message are displayed with a common indent spacing. This can be seen by messages 252 and 254, for instance. Both of them are in reply to parent message 256. However, replies to replies are also shown. For instance, message 258 is indented with respect to message 252, indicating that it is a reply to message 252 which, itself, is a reply to message 256. Of course, indenting and showing the reply message below the parent message is only one exemplary way of positioning replies to parent messages, and others can be used as well.

It should also be noted that user interface display 250 includes a text box 260 to insert replies, along with a reply user input button 262. When the user types text into text box 260 and highlights or selects one of the messages from message pane 251, the user can actuate the reply button 262 and the new message will be displayed as a reply to the selected parent message in pane 251. User interface display 250 also includes a text box 264 for inserting a message that is on a new topic. When the new message is typed in box 262, new topic button 266 can be actuated, indicating that the message is a new topic and is not a reply to any parent message.

Figure 5E:
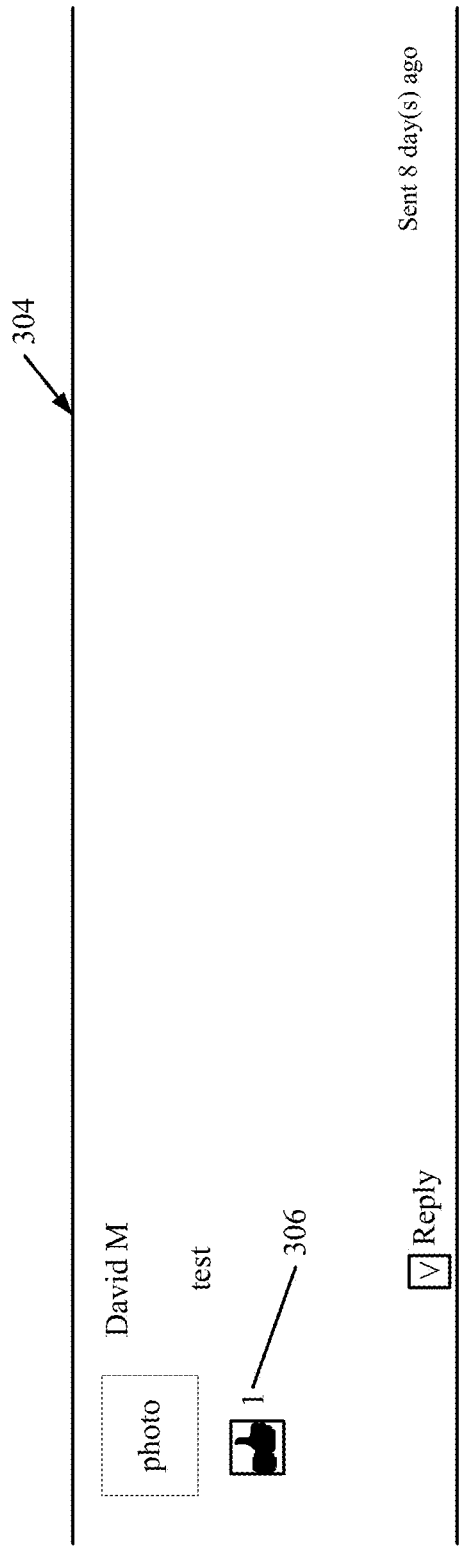

Referring again to FIG. 4, RTF processing component 134 and receiving device 104 can also hide a parent message, as indicated by block 300. For instance, when the sending user wishes to hide a message that was previously sent, the sending user can send a subsequent RTF message, identifying the parent message (such as by selecting the parent message on a UI display), and inserting a custom RTF command indicating that the parent message is to be hidden (such as by actuating a "hide" button on the UI display). In that case, the receiving RTF processing component 134 writes over the identified parent message (thus hiding it from receiving user 140).

Where the communication system is a social networking system or other system that allows a user to "like" content, the custom RTF command can be a "like" command and identify the parent message that is to be "liked". This is indicated by block 302 in FIG. 4. FIG. 5E shows a user interface display 304 that indicates this. By specifying a message ID as "liked" in the custom RTF command, the RTF processing component 134 and receiving device 104 can increase a counter in the "liked" message item. The user interface display can include a display element 306 that indicates that the message has been liked a given number of times. By way of example, the user can select the message to be "liked" on a UI display and then actuate a "like" button. In response, RTF processing component generates a custom RTF command with the parent message ID of the user-selected message and the "like" command generated based on the user actuating the "like" button.

Figure 5F:
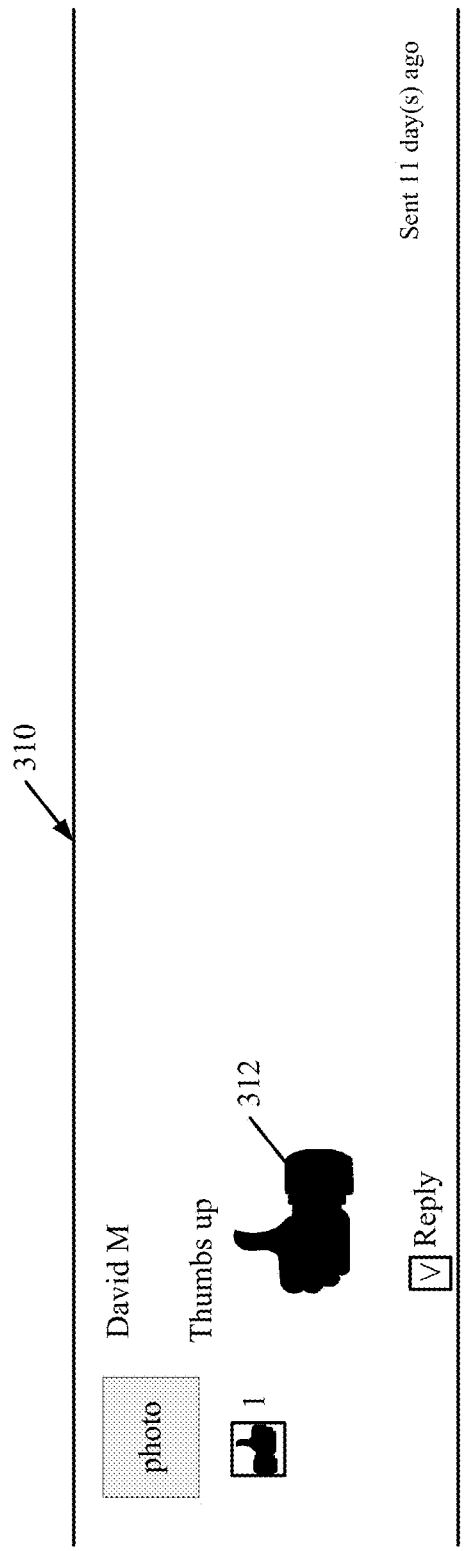

The custom RTF command can also display an inline image in the message thread. This is indicated by block 308 in FIG. 4. FIG. 5F shows a user interface display indicative of this. Where the custom RTF command is one such as the following:

{\*\image http:V/upload.wikimedia.org/Wikipedia/commons/7/7e/Thumbs-up-icon.png}

It identifies an image URL that can be displayed with the rest of the RTF message. User interface display 310 is one example of this. It can be seen that in the message, an image 312 that was retrieved from the URL identified in the custom RTF command is displayed, in line, in the message thread.

The custom RTF commands can be used to perform a host of other actions as well. For instance, an RTF command such as the following:

{\*\ topic randomtopic} can be used to specify a topic. When a topic is specified using a custom RTF command, the receiving RTF processing component 134 can filter the message thread showing only messages that have the specified topic. This type of filtering is indicated by block 320 in FIG. 4.

Similarly, as briefly described above with respect to FIG. 2, the custom RTF command can be used as a book mark to jump to new messages in a chat room. Where the custom RTF command is, for example, of the following form:

{\*\lastReadMessageID 99}

This can store or identify the last message ID that was read when the user generated this custom RTF message. Thus, the next time the user opens the chat room, the user interface display can show the latest messages, beginning with the last read message (or the message just subsequent to the last read message). The user interface display need not show the message that saves this data. That is, the user interface display may either show the book mark, or give no indication that a book mark message was generated and simply jump to the marked position in the chat thread. Of course, this type of custom RTF message can be used to save other states as well, and the jump location (or last read message) is only one example. Identifying a jump location is indicated by block 322 in FIG. 4.

It will of course be noted that the particular custom RTF commands and associated actions described above are only exemplary. Custom RTF commands can be used to perform a whole host of other actions as well, and this is indicated by block 324 in FIG. 4. Similarly, the specific form or content of the custom RTF messages described above are exemplary as well, and others could also be used.

Figure 6:
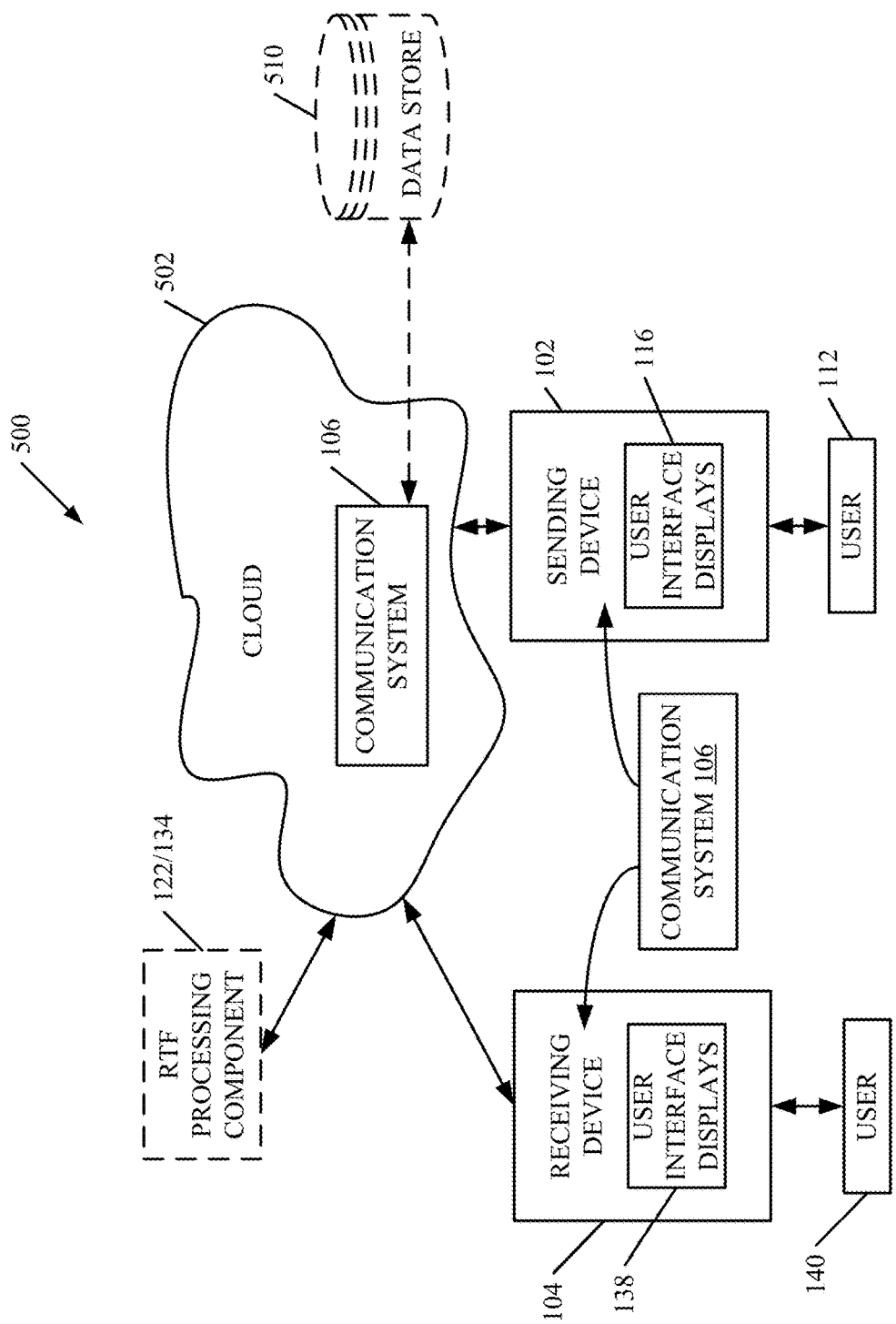
FIG. 6 shows a block diagram of the messaging system in various architectures.

FIG. 6 is a block diagram of system 100, shown in FIG. 1, except that it is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that communication system 106 is located in cloud 502 (which can be public, private, or a combination where portions are public while others are private). Therefore, users 112, 140 use devices 102, 104 to access those systems through cloud 502.

FIG. 6 also depicts another embodiment of a cloud architecture. FIG. 6 shows that it is also contemplated that some elements of business system 100 are disposed in cloud 502 while others are not. By way of example, data store 510 (which can be used by communication system 106) can be disposed outside of cloud 502, and accessed through cloud 502. In another embodiment, RTF processing component 122, 134 is also outside of cloud 502. Regardless of where they are located, they can be accessed directly by devices 102, 104, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
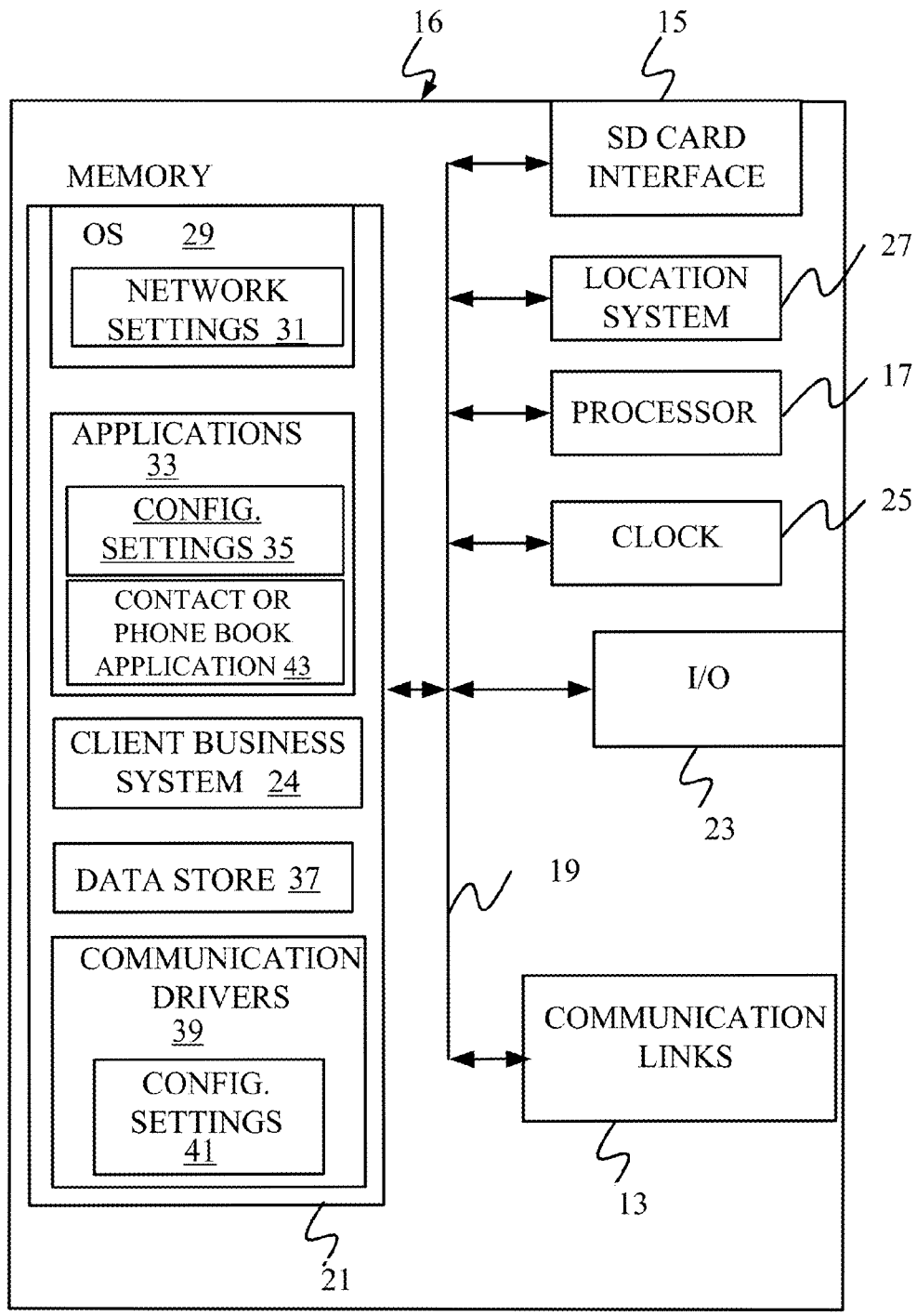
FIGS. 7-11 show various embodiments of mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of system 100 (e.g., it can embody devices 102, 104) or that interacts with system 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like portions of system 100) are received on a removable Secure Digital (SD) card that is connected to a SD card interface 15. SD card interface 15 and communication links 13 communicate with a processor 17 (which can also embody processors 120, 122, 132, 134 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100, applications 124, 136 or the items in data store 510, for example, can reside in memory 21. Similarly, device 16 can have a client system 24 which can run various applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
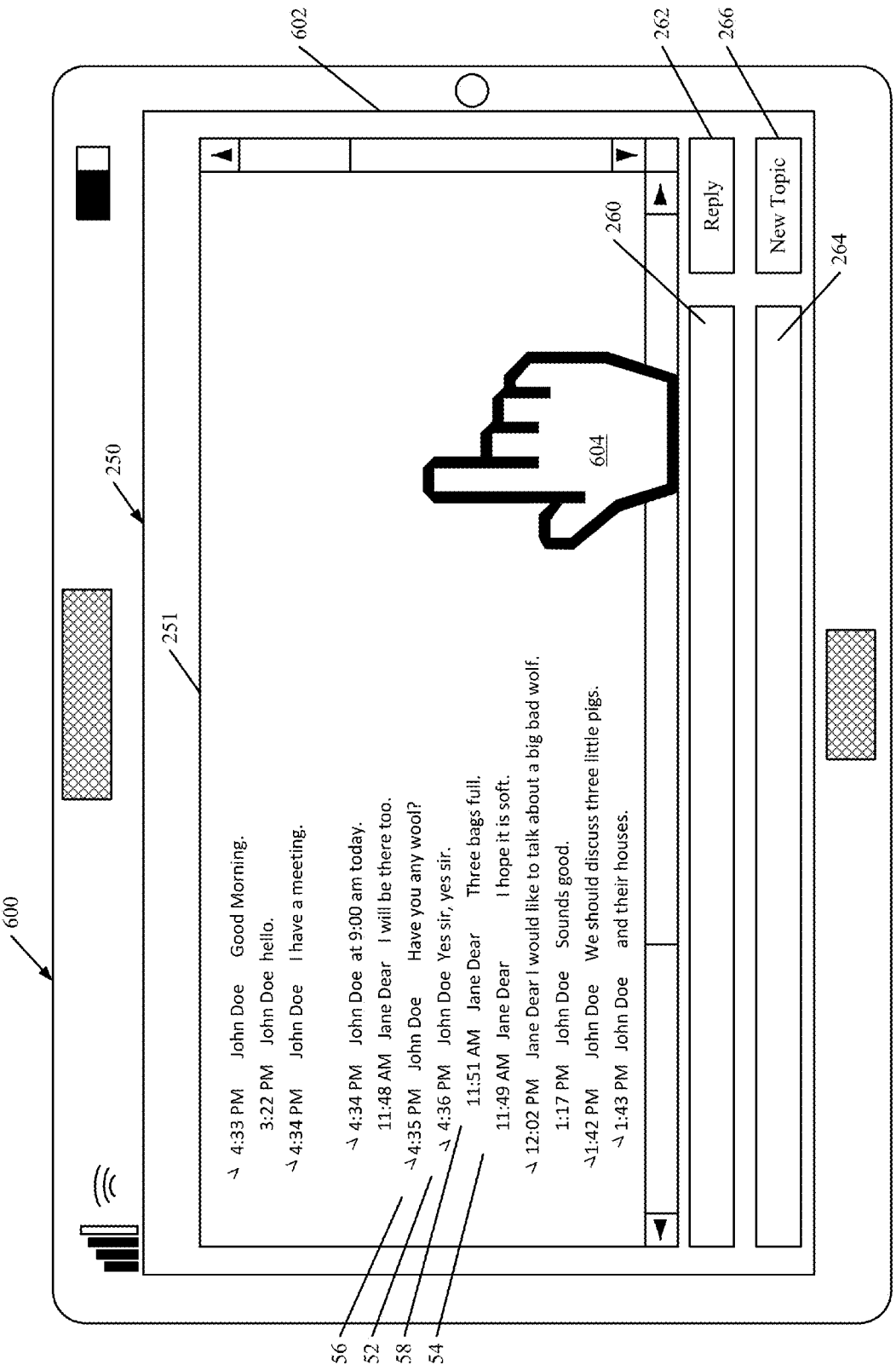
Figure 9:
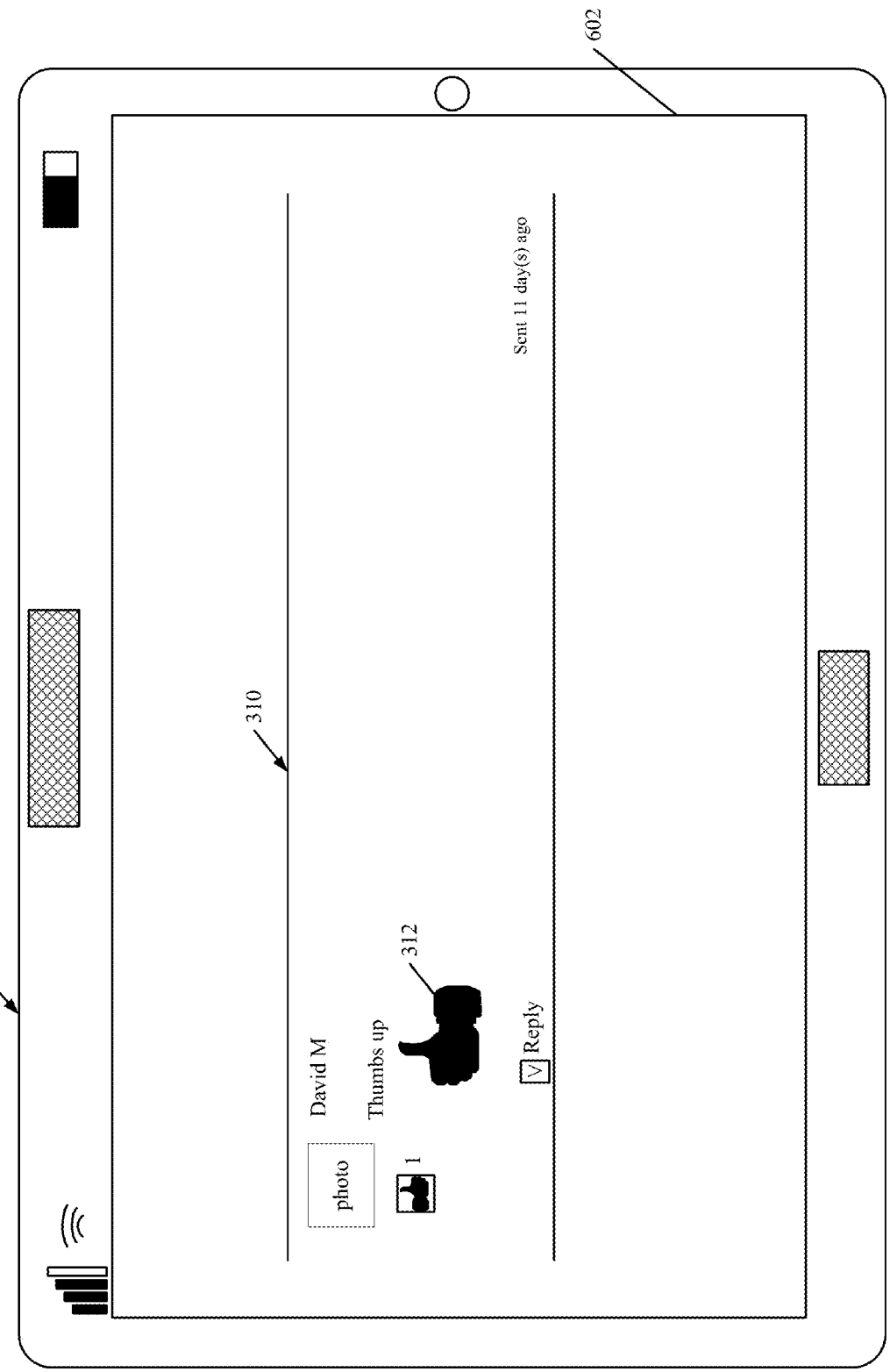

FIGS. 8 and 9 show one embodiment in which device 16 is a tablet computer 600. In FIG. 8, computer 600 is shown with user interface display 251 (used to show reply messages) displayed on the display screen 602. FIG. 9 shows computer 600 with user interface display 310 (used to show an in-line image) displayed on display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
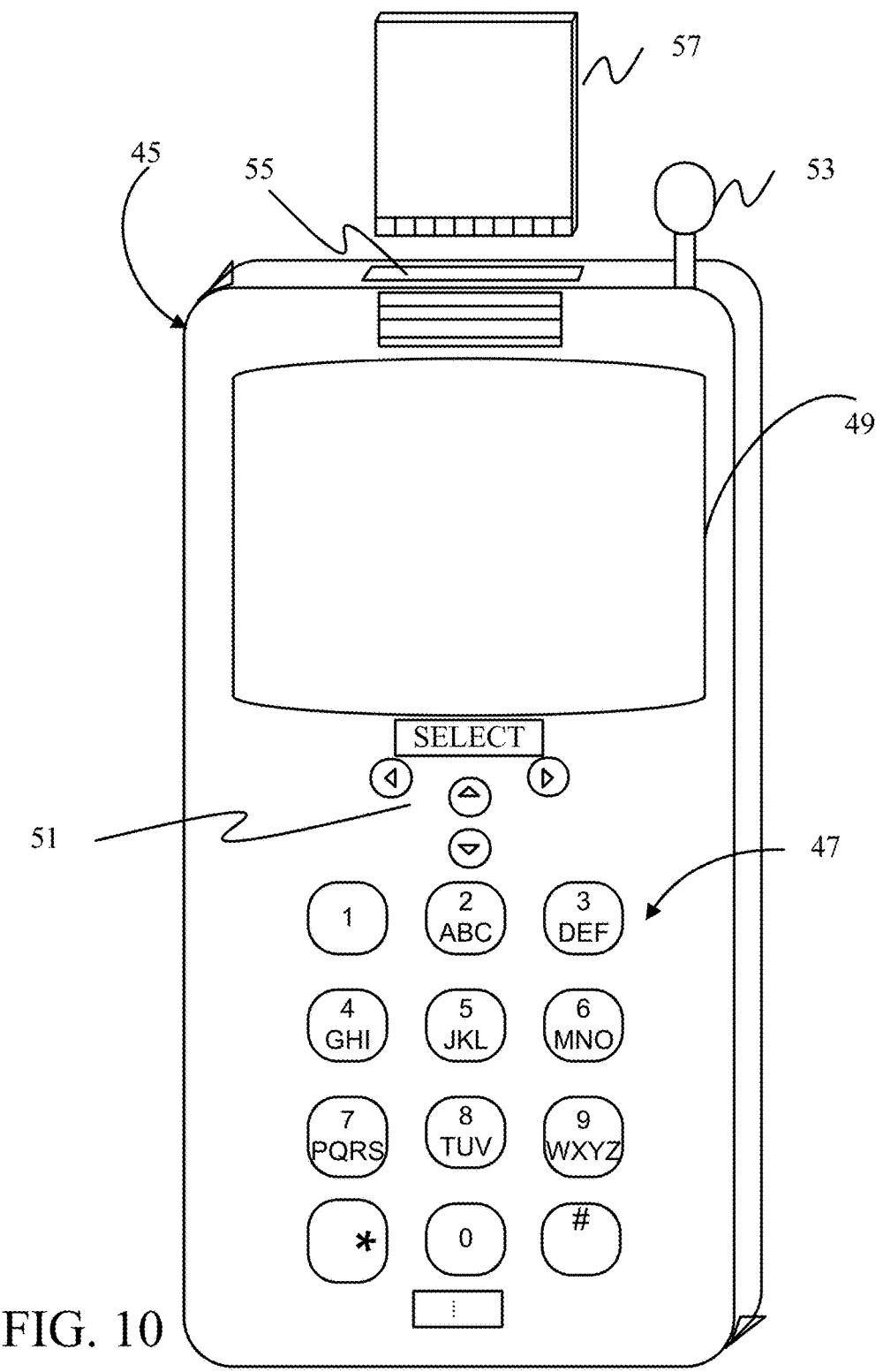
Figure 11:
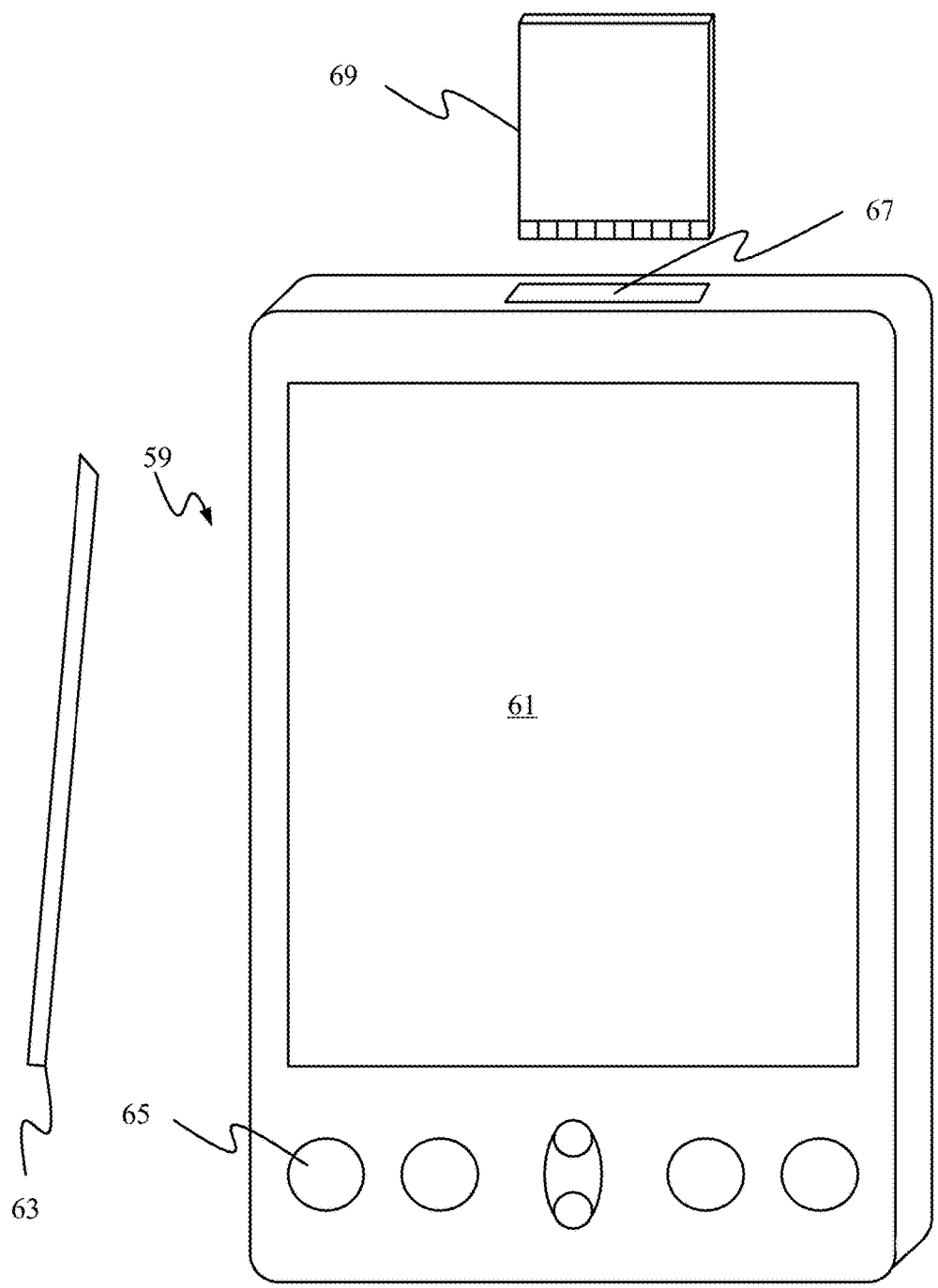

FIGS. 10 and 11 provide additional examples of devices 16 that can be used, although others can be used as well. In FIG. 10, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 12:
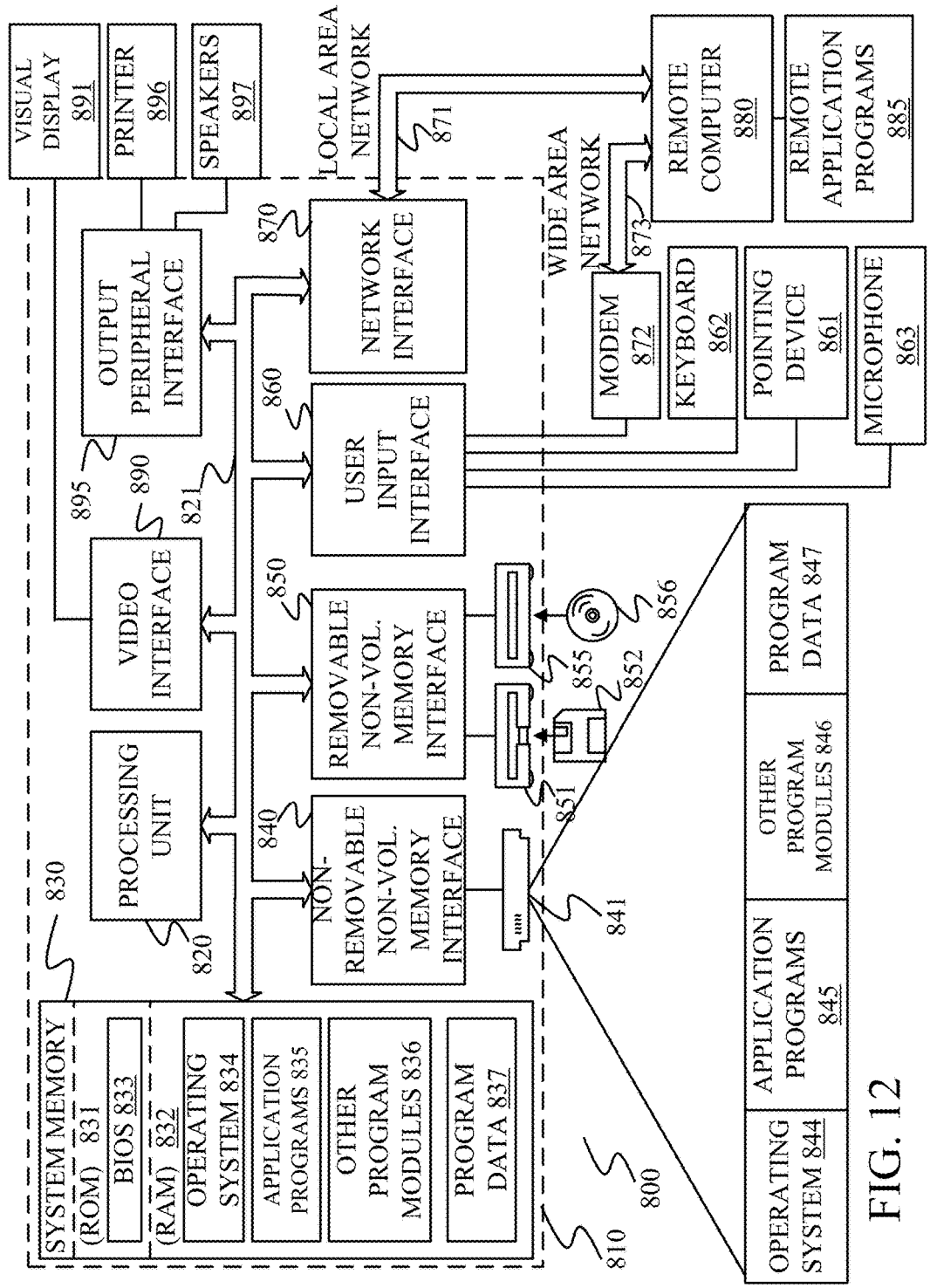
FIG. 12 is a block diagram of one illustrative computing environment.

FIG. 12 is one embodiment of a computing environment in which system 100 (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processors 120, 122, 132, 134), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It will also be noted that the embodiments described herein can be combined as well. That is, one or more features of one embodiment can be combined with one or more features of other embodiments. This is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
at least one processor; and
memory storing instructions executable by the at least one of processor, wherein the instructions, when executed, configure the computing device to:
generate an instant messaging user interface display, for an instant messaging application, with a reply command user input mechanism and a message content user input mechanism configured to receive a user message input for a Rich Text Format (RTF) message;
receive the user message input, through the message content user input mechanism;
generate message content based on the user message input;
detect user actuation of the reply command user input mechanism indicating that the RTF message is a reply to a parent message;
generate a parent message identifier (parent id) based on the detected user actuation of the reply command user input mechanism, wherein the parent id identifies the parent message;
generate an RTF message that is formatted in accordance with RTF protocol, the RTF message including a message content portion and a non-format command portion that is separate from the message content portion, wherein the message content portion includes the message content and a format RTF command for the RTF message, and the non-format command portion includes the non-format RTF command including the parent id; and
provide the RTF message to a communication system for transmission to a recipient.

2. The computing device of claim 1 wherein the message content portion comprises unformatted text, and the RTF message comprises one or more groups, each group comprising one or more control codes or symbols enclosed in braces that specify the text that is affected by the group and attributes of the text that is represented by the one or more control codes or symbols.

3. The computing device of claim 1 wherein the instructions configure the computing device to:
receive a second RTF message from the communication system;
detect a second non-format command in the second RTF message; and
perform a processing action based on the second non-format command.

4. The computing device of claim 3 wherein the instructions configure the computing device to:
detect the second non-format command by identifying a non-format command location in the second RTF message and determining that the non-format command location includes the second non-format command.

5. The computing device of claim 3 wherein the second non-format command includes a second parent message identifier (parent id) identifying a second parent message, and wherein the instructions configure the computing device to perform the processing action with reference to the second parent message.

6. The computing device of claim 5 wherein the second non-format command comprises a reply command and wherein the instructions configure the computing device to:
generate, as the processing action, a user interface display that displays the second RTF message relative to the second parent message to visually indicate that the second RTF message is in reply to the second parent message.

7. The computing device of claim 5 wherein the second non-format command comprises a hide command and wherein the instructions configure the computing device to:
generate, as the processing action, a user interface display that covers the second parent message to visually hide the second parent message.

8. The computing device of claim 5 wherein the second non-format command comprises a like command and wherein the instructions configure the computing device to:
generate, as the processing action, a user interface display that displays an indicator indicating that the second parent message is liked.

9. The computing device of claim 5 wherein the second non-format command comprises an in-line image display command and wherein the instructions configure the computing device to:
generate, as the processing action, a user interface display that displays an in-line image in a message thread.

10. The computing device of claim 5 wherein the second non-format command comprises a jump location command and wherein the instructions configure the computing device to:
generate, as the processing action, a user interface display that displays messages in a chat room, beginning at a location identified by the jump location command.

11. The computing device of claim 5 wherein the second non-format command comprises a filter command and wherein the instructions configure the computing device to:
generate, as the processing action, a user interface display that displays messages filtered based on criteria in the filter command.

12. A computer-implemented method comprising:
generating a chat message input user interface display, for a chat room application, with a reply command user input mechanism and a message content user input mechanism for receiving message content for a Rich Text Format (RTF) chat message;
detecting user actuation of the reply command user input mechanism indicating that the RTF chat message is a reply to a parent chat message;
generating a parent message identifier (parent id) based on the detected user actuation of the reply command user input mechanism, wherein the parent id identifies the parent message;
receiving the message content for the RTF chat message through the message content user input mechanism;
generating the RTF chat message formatted in accordance with Rich Text Format (RTF) protocol, the RTF chat message including a message content portion and a non-format command portion that is separate from the message content portion, the message content portion including the message content and a format RTF command for the RTF chat message, and the non-format command portion including the parent id; and
providing the RTF chat message to a chat room communication system for transmission to a recipient.

13. The computer-implemented method of claim 12 wherein generating the RTF chat message comprises:
identifying a location in the RTF chat message for insertion of the parent id; and
inserting the parent id at the identified location of the RTF chat message.

14. The computer-implemented method of claim 12 wherein displaying the chat message input user interface display comprises:
displaying a user actuatable input mechanism which, when actuated by a user, is indicative of a non-format RTF command, wherein the RTF chat message includes a message content portion and a non-format command portion, the message content portion including the RTF message content and the non-format command portion including the non-format rtf command.

15. The computer-implemented method of claim 14 wherein displaying the user actuatable input mechanism comprises at least one of:
displaying a hide input mechanism which, when actuated by the user, indicates that the non-format command comprises a hide command to hide the parent message identified by the parent id;
displaying a like input mechanism which, when actuated by the user, indicates that the non-format RTF command comprises a like command so a like indicator corresponding to a parent message, identified in the non-format RTF command, is activated; or
displaying a display image input mechanism which, when actuated by the user, indicates that the non-format RTF command comprises an in-line image display command that displays an image in line in a message thread.

16. The computer-implemented method of claim 12, wherein the message content portion comprises unformatted text, and the RTF chat message comprises one or more groups, each group comprising one or more control codes or symbols enclosed in braces that specify the text that is affected by the group and attributes of the text that is represented by the one or more control codes or symbols.

17. A computer-implemented method comprising:
displaying a social media user interface display, for a social media application, with a user input mechanism;
receiving a user message input through the user input mechanism;
generating message content based on the user message input;
displaying a command generation user input mechanism;
based on user actuation of the command generation user input mechanism, generating a non-format Rich Text Format (RTF) command;
generating an RTF message that is formatted in accordance with RTF protocol, the RTF message including a message content portion and a non-format command portion, the message content portion including the message content, and the non-format command portion including the non-format RTF command and a parent message identifier (parent id) that identifies a parent message to the RTF message, wherein
the non-format RTF command comprises at least one of:

a hide command configured to hide the parent message identified by the parent id, wherein the generated RTF message is a reply to the parent message;

a like command configured to activate a like indicator corresponding to the parent message identified in the non-format RTF command; or an in-line image display command configured to display an image in line in a message thread;

wherein generating the RTF message comprises:

identifying a location in the RTF message for insertion of the non-format RTF command; and inserting the non-format RTF command at the identified location of the RTF message; and providing the RTF message to a social media communication system for transmission to a recipient.

18. The computer readable storage medium of claim 17, wherein the RTF message comprises one or more groups, each group comprising one or more control codes or symbols enclosed in braces that specify the text that is affected by the group and attributes of the text that is represented by the one or more control codes or symbols.

* * * * *